(12) United States Patent
Islam et al.

(10) Patent No.: US 11,917,709 B2
(45) Date of Patent: Feb. 27, 2024

(54) L1 SIGNALLING FOR TRANSITIONING SECONDARY CELLS (SCELLS) BETWEEN DORMANCY AND NON-DORMANCY IN 5G NR

(71) Applicant: Intel Corporation, Santa Clara, CA (US)

(72) Inventors: Toufiqul Islam, Santa Clara, CA (US); Dae Won Lee, Portland, OR (US); Yingyang Li, Beijing (CN); Seunghee Han, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 346 days.

(21) Appl. No.: 17/071,640

(22) Filed: Oct. 15, 2020

(65) Prior Publication Data

US 2021/0029772 A1    Jan. 28, 2021

Related U.S. Application Data

(60) Provisional application No. 62/933,219, filed on Nov. 8, 2019, provisional application No. 62/925,135, filed on Oct. 23, 2019, provisional application No. 62/916,127, filed on Oct. 16, 2019.

(51) Int. Cl.
| | |
|---|---|
| *H04W 72/04* | (2023.01) |
| *H04W 76/27* | (2018.01) |
| *H04L 1/1607* | (2023.01) |
| *H04W 24/08* | (2009.01) |
| *H04W 72/23* | (2023.01) |
| *H04W 84/04* | (2009.01) |

(52) U.S. Cl.
CPC .......... *H04W 76/27* (2018.02); *H04L 1/1614* (2013.01); *H04W 24/08* (2013.01); *H04W 72/23* (2023.01); *H04W 84/042* (2013.01)

(58) Field of Classification Search
None
See application file for complete search history.

(56) References Cited

U.S. PATENT DOCUMENTS

| | | | |
|---|---|---|---|
| 2020/0092814 A1* | 3/2020 | Zhou | H04W 52/0235 |
| 2021/0377852 A1* | 12/2021 | Zhou | H04W 52/0235 |
| 2022/0052829 A1* | 2/2022 | Kim | H04W 72/0453 |
| 2023/0026953 A1* | 1/2023 | Zhang | H04W 52/0216 |

* cited by examiner

*Primary Examiner* — Willie J Daniel, Jr.
(74) *Attorney, Agent, or Firm* — Schwegman Lundberg & Woessner, P.A.

(57) ABSTRACT

A user equipment (UE) for operation in a fifth-generation new radio (5G NR) network may be configured with two or more secondary cells (SCells) of a group of SCells. In these embodiments, the UE may monitor a physical downlink control channel (PDCCH) for detection of a downlink control information (DCI) format 1_1. The UE may interpret the DCI format 1_1 as indicating SCell dormancy, rather than scheduling a physical downlink shared channel (PDSCH) reception, if the UE is configured with resourceAllocationType1 and if all bits of a frequency domain resource assignment field in the DCI format 1_1 are equal to 1. For SCell dormancy, the UE may interpret fields of the DCI format 1_1 as a bitmap for SCell dormancy indication and either activate or deactivate a downlink bandwidth part (DL BWP) for an SCell of the group of configured SCells when indicated by the bitmap.

20 Claims, 2 Drawing Sheets

L1 SIGNALLING FOR TRANSITIONING SECONDARY CELLS (SCELLS) BETWEEN DORMANCY AND NON-DORMANCY IN 5G NR

PRIORITY CLAIM

This application claims priority under 35 USC 119(e) to U.S. Provisional Patent Application Ser. No. 62/916,127, filed Oct. 16, 2019 [reference number AC5663-Z], U.S. Provisional Patent Application Ser. No. 62/925,135, filed Oct. 23, 2019 [reference number AC5901-Z], and U.S. Provisional Patent Application Ser. No. 62/933,219, filed Nov. 8, 2019 [reference number AC6277-Z], which are incorporated herein by reference in their entireties.

TECHNICAL FIELD

Embodiments pertain to wireless communications. Some embodiments relate to fifth generation (5G) new radio (NR) communications. Some embodiments relate to carrier aggregation (CA) in 5G NR. Some embodiments relate to secondary cell (SCell) dormancy.

BACKGROUND

A UE in a 5G NR network can be configured with one or more SCells in CA operation. However, one or more of the configured and activated SCells may not be used always for data transmission. Hence, if data transmission in one or more SCells is not expected, the gNB can signal the UE to stop monitoring scheduling DCI in one or more SCells to conserve power. On the other hand, when there is a need, the gNB can trigger the UE to begin to monitor PDCCH in those SCells.

Thus, there are general needs for improved signalling so that UE identifies when to stop or reduce PDCCH monitoring activity in one or more SCells and when to resume regular PDCCH monitoring activity in the SCells.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

New radio (NR) user equipment (UE) can be configured with one or more secondary cells (SCells) in carrier aggregation (CA) operation. However, one or more of the configured and activated SCells may not be used always for data transmission. Hence, if data transmission in one or more SCells is not expected, gNB can signal the UE to stop monitoring scheduling DCI in one or more SCells (e.g., dormancy like state) and conserve power. On the other hand, when there is a need, network can trigger the UE so that one or more SCells that was in dormancy before, can be awaken and UE can begin to monitor PDCCH in those SCells (non-dormancy state). This disclosure provides L1 signaling mechanism for transitioning between dormancy and non-dormancy-like states.

Previously, MAC CE signaling was used for SCell activation and deactivation. However, MAC CE signaling is slow compared to DCI-based indication used in conjunction with embodiments disclosed herein.

In accordance with some embodiments, a UE configured for operation in a fifth-generation new radio (5G NR) network may be configured two or more secondary cells (SCells) of a group of SCells. In some embodiments, the UE may be configured for carrier aggregation (CA). In some embodiments, the UE may monitor a physical downlink control channel (PDCCH) for detection of a downlink control information (DCI) format 1_1. The UE may interpret the DCI format 1_1 as indicating SCell dormancy, rather than scheduling a physical downlink shared channel (PDSCH) reception, if the UE is configured with resource Allocation Type 1 (resourceAllocationType1) and if all bits of a frequency domain resource assignment field in the DCI format 1_1 are equal to 1. In these embodiments, for the SCell dormancy, the UE may interpret fields of the DCI format 1_1 as a bitmap for SCell dormancy indication and either activate or deactivate a downlink bandwidth part (DL BWP) for an SCell of the group of configured SCells when indicated by the bitmap. These embodiments are discussed in more detail below.

Figure 1:
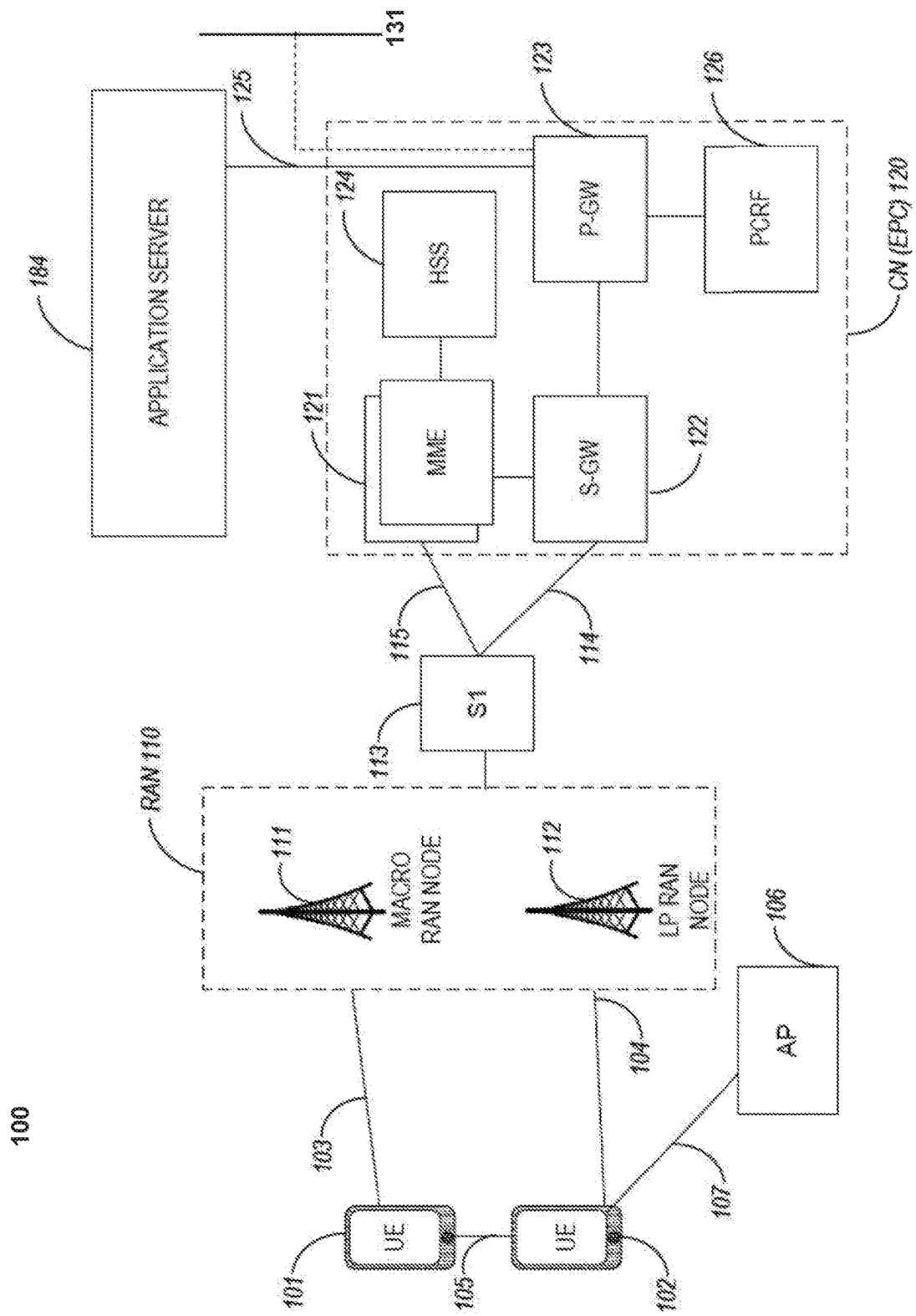
FIG. 1 illustrates an architecture of a network in accordance with some embodiments.

FIG. 1 illustrates an architecture of a network in accordance with some embodiments. The network 100 is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 100 or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN. In this aspect, the S1 interface 113 is split into two parts: the S1-U interface 114, which carries traffic data between the RAN nodes 111 and 112 and the serving gateway (S-GW) 122, and the S-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131, which can include the Internet, IP multimedia subsystem (IPS) network, and other networks. Generally, the application server 184 may be an element offering applications that use IP bearer resources with the core network (e.g., UMTS Packet Services (PS)

domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 100 can be an IoT network or a 5G network, including 5G new radio network using communications in the licensed (5G NR) and the unlicensed (5G NR-U) spectrum. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Some embodiments are directed to an apparatus for a user equipment (UE). In accordance with these embodiments, the UE may be configured for operation in a fifth-generation new radio (5G NR) network and may be configured with two or more secondary cells (SCells) of a group of SCells. In these embodiments, the UE may monitor a physical downlink control channel (PDCCH) for detection of a downlink control information (DCI) format 1_1. The UE may interpret the DCI format 1_1 as indicating SCell dormancy, rather than scheduling a physical downlink shared channel (PDSCH) reception, if the UE is configured with resourceAllocationType1 and if all bits of a frequency domain resource assignment field in the DCI format 1_1 are equal to 1. In these embodiments, for the SCell dormancy, the UE may interpret fields of the DCI format 1_1 as a bitmap for SCell dormancy indication and either activate or deactivate a downlink bandwidth part (DL BWP) for an SCell of the group of configured SCells when indicated by the bitmap.

In some embodiments, the UE may interpret the DCI format 1_1 as scheduling the PDSCH reception when either the UE is not configured with the resourceAllocationType1 or when all bits of the frequency domain resource assignment field in the DCI format 1_1 are not equal to 1. In these embodiments, when either the UE is not configured with the resourceAllocationType1 or when all bits of a frequency domain resource assignment field in the DCI format 1_1 are not equal to 1, the UE will refrain from interpreting fields of the DCI format 1_1 as a bitmap for SCell dormancy indication.

In some embodiments, when the fields of the DCI format 1_1 are interpreted as the bitmap for SCell dormancy indication, each bit of the bitmap corresponds to an activated SCell of the group of configured SCells, and the size of the bitmap may be equal to a number of the groups of configured SCells. Each bit points to a group of SCells.

In some embodiments, when the fields of the DCI format 1_1 are interpreted as the bitmap for SCell dormancy indication, a '0' value for a bit of the bitmap indicates that an active DL BWP is a dormant DL BWP for an activated SCell in the group of configured SCells. In these embodiments, a '1' value for a bit of the bitmap indicates either: an active DL BWP for an activated SCell in the group of configured SCells if a current active DL BWP is the dormant DL BWP (i.e., the active BWP is different than the dormant BWP), or a current active DL BWP for an activated SCell in the group of configured SCells if the current active DL BWP is not the dormant DL BWP. In these embodiments, if a '0' is indicated, the active DL BWP is the dormant BWP (i.e., a BWP where PDCCH monitoring activity is minimal). If a '1' is indicated, the UE could either switch to non-dormant BWP if it was in dormant BWP previously or stay in current active DL BWP if it is not a dormant BWP. In these embodiments, the UE remains in a dormant BWP for an SCell when a '0' is indicated in the bitmap, and the UE will change from a dormant BWP to an active BWP when a '1' is indicated in the bitmap if the BWP was a dormant BWP.

In some embodiments, the fields of the DCI format 1_1 that are interpreted as the bitmap for SCell dormancy indication comprise a modulation and coding scheme field, a new data indicator field, a redundancy version field, a HARQ process number field, an antenna port(s) field, and a DMRS sequence initialization field.

In some embodiments, for an active DL BWP of an activated SCell, the UE may monitor a PDCCH for the activated SCell and perform channel state information (CSI) measurements. For a dormant DL BWP of an activated SCell, the UE may refrain or minimize monitoring a PDCCH for the activated SCell while configured in the UE to continue to perform CSI measurements if configured.

In some embodiments, the UE may decode radio-resource control (RRC) signalling that may provide the UE with search space sets to monitor the PDCCH for detection of the DCI Format 1_1, the RRC signalling to configure the UE with the resourceAllocationType1. In some embodiments, resource Allocation Type 1 may be in accordance with the 3GPP Technical Standards TS 38.212 and TS 38.214, Release 15.

In some embodiments, if the UE is provided search space sets to monitor the PDCCH for detection of DCI format 0_1 and the DCI format 1_1 and if one or both of the DCI format 0_1 and the DCI format 1_1 include an SCell dormancy indication field, the SCell dormancy indication field may comprise the bitmap for SCell dormancy indication. In these embodiments, the SCell dormancy indication field is explicitly indicated to be included in the DCI format.

In some embodiments, the UE may decode downlink signals received within the activated DL BWPs of two or more SCells in accordance with carrier aggregation.

Some embodiments are directed to an apparatus for next-generation Node B (gNB) configured for operation in a fifth-generation new radio (5G NR) network. In these embodiments, the gNB may configure a user equipment (UE) for carrier aggregation (CA) with two or more secondary cells (SCells) of a group of SCells. In these embodiments, the gNB may encode radio-resource control (RRC) signalling for transmission to the UE to configure the UE with a resourceAllocationType1. The gNB may also encode a physical downlink control channel (PDCCH) for include a downlink control information (DCI) format 1_1 for transmission to the UE. If the UE is configured with the resourceAllocationType1 and if all bits of a frequency domain resource assignment field in the DCI format 1_1 are equal to 1, the gNB may encode fields of the DCI format 1_1 as a bitmap for SCell dormancy indication to signal to the UE to either activate or deactivate a downlink bandwidth part (DL BWP) for an SCell of the group of configured SCell.

In some embodiments, the gNB may encode the fields of the DCI format 1_1 as scheduling a physical downlink shared channel (PDSCH) reception when either the UE is not configured with the resourceAllocationType1 or when all bits of the frequency domain resource assignment field in the DCI format 1_1 are not equal to 1.

In accordance with various embodiments herein:

1 On demand RS can be configured to achieve finer tracking for receiving DCI in a PDCCH for waking up the UE to monitor/receive scheduling DCIs during DRX ON.

2. DCI in a PDCCH can be signaled to the UE during active time to skip PDCCH monitoring in one or more cells/carriers 3. DCI in a PDCCH may provide wake-up signaling and additionally provide A-CSI trigger and indicate UL resources for CSI reporting.

In the context of the disclosure, 'dormancy-like' implies sparse or no PDCCH monitoring on activated SCell while maintaining CSI measurements/reporting. Non-dormancy-like implies no restriction on PDCCH monitoring or frequent PDCCH monitoring along with other measurement procedures at the UE. The embodiments can be applied for both FDD and TDD carriers and a combination of them in CA operation.

The proposed embodiments consist of modification of one or more of existing or new scheduling DCI formats. Below, we provide description of the fields that can be present in different existing or new scheduling DCI formats. If one or more of existing fields in the DCI format is referred in the embodiments/examples below, it corresponds to the list below which shows fields that can be present in different DCI formats.

DCI format 1_0 may have one or more of the following fields (reference 3GPP TS 38.212 spec)
  Identifier for DCI formats—1 bits
  The value of this bit field is always set to 1, indicating a DL DCI format
  Frequency domain resource assignment—⌈log 2 (NRB DL,BWP(NRB DL,BWP+1)/2)⌉ bits where NRB DL,BWP is given by subclause 7.3.1.0
  Reserved bits—10 bits
  Time domain resource assignment—4 bits as defined in Subclause 5.1.2.1 of [TS 38.214]
  VRB-to-PRB mapping—1 bit according to Table 7.3.1.1.2-33
  Modulation and coding scheme—5 bits as defined in Subclause 5.1.3 of [TS 38.214]
  New data indicator—1 bit
  Redundancy version—2 bits as defined in Table 7.3.1.1.1-2
  HARQ process number—4 bits
  Downlink assignment index—2 bits as defined in Subclause 9.1.3 of [TS 38.213], as counter DAI
  TPC command for scheduled PUCCH—2 bits as defined in Subclause 7.2.1 of [5, TS 38.213]
  PUCCH resource indicator—3 bits as defined in Subclause 9.2.3 of [TS 38.213]
  PDSCH-to-HARQ_feedback timing indicator—3 bits as defined in Subclause 9.2.3 of TS38.213]

DCI format 1_1 or a new Rel16 non-fallback DL DCI format 1_x (e.g., x=2, compact DCI format) may have one or more of the following fields (reference 3GPP TS 38.212 spec)
  Identifier for DCI formats—1 bits
  The value of this bit field is always set to 1, indicating a DL DCI format
  Carrier indicator—0 or 3 bits as defined in Subclause 10.1 of [TS 38.213].
  Bandwidth part indicator—0, 1 or 2 bits
  Frequency domain resource assignment—number of bits determined by the following, where $N_{RB}^{DL,BWP}$ is the size of the active DL bandwidth part:
    $N_{RBG}$ bits if only resource allocation type 0 is configured, where $N_{RBG}$ is defined in Subclause 5.1.2.2.1 of [TS38.214],
    $\lceil \log 2 (N_{RB\_DL,BWP}(N_{RB\_DL,BWP}+1)/2) \rceil$ bits if only resource allocation type 1 is configured, or
    $\max(\lceil \log 2 (N_{RB\_DL,BWP}(N_{RB\_DL,BWP}+1)/2) \rceil, N_{RGB})+1$ bits if both resource allocation type 0 and 1 are configured.
  Time domain resource assignment—0, 1, 2, 3, or 4 bits as defined in Subclause 5.1.2.1 of [TS 38.214].
  VRB-to-PRB mapping—0 or 1 bit:
  PRB bundling size indicator—0 bit or 1 bit
  Rate matching indicator—0, 1, or 2 bits
  ZP CSI-RS trigger—0, 1, or 2 bits as defined in Subclause 5.1.4.2 of [6, TS 38.214].
For transport block 1:
  Modulation and coding scheme—5 bits as defined in Subclause 5.1.3.1 of [TS 38.214]
  New data indicator—1 bit
  Redundancy version—2 bits as defined in Table 7.3.1.1.1-2
For transport block 2 (only present if maxNrofCodeWordsScheduledByDCI equals 2):
  Modulation and coding scheme—5 bits as defined in Subclause 5.1.3.1 of [TS 38.214]
  New data indicator—1 bit
  Redundancy version—2 bits as defined in Table 7.3.1.1.1-2
  HARQ process number—4 bits
  Downlink assignment index—number of bits as defined in the following
  4 bits if more than one serving cell are configured in the DL and the higher layer parameter pdsch-HARQACK-Codebook=dynamic, where the 2 MSB bits are the counter DAI and the 2 LSB bits are the total DAI;
  2 bits if only one serving cell is configured in the DL and the higher layer parameter pdsch-HARQ-ACKCodebook=dynamic, where the 2 bits are the counter DAI;

TPC command for scheduled PUCCH—2 bits as defined in Subclause 7.2.1 of [TS 38.213]
PUCCH resource indicator—3 bits as defined in Subclause 9.2.3 of [TS 38.213]
PDSCH-to-HARQ_feedback timing indicator—0, 1, 2, or 3 bits as defined in Subclause 9.2.3 of [TS 38.213].
Antenna port(s)—4, 5, or 6 bits
SRS request—2 bits as defined by Table 7.3.1.1.2-24 of 38.212
CBG transmission information (CBGTI)—0, 2, 4, 6, or 8 bits as defined in Subclause 5.1.7 of [6, TS38.214]
CBG flushing out information (CBGFI)—0 or 1 bit as defined in Subclause 5.1.7 of [6, TS38.214]
DMRS sequence initialization—1 bit.
Priority indication—0 or 1 or 2 bits
HARQ-ACK codebook identification—0 or 1 or 2 bits
DCI format 0_0 may have one or more of the following fields (reference 3GPP TS 38.212 spec)
Identifier for DCI formats—1 bit
The value of this bit field is always set to 0, indicating an UL DCI format
Frequency domain resource assignment—[log 2 $(NRB^{UL,BWP}(NRB^{UL,BWP}+1)/2)$] bits where $NRB^{UL,BWP}$ is defined in subclause 7.3.1.0 of TS 38.212
Time domain resource assignment—4 bits as defined in Subclause 6.1.2.1 of [6, TS 38.214]
Frequency hopping flag—1 bit according to Table 7.3.1.1.1-3, as defined in Subclause 6.3 of [6, TS 38.214]
Modulation and coding scheme—5 bits as defined in Subclause 6.1.4.1 of [6, TS 38.214]
New data indicator—1 bit
Redundancy version—2 bits as defined in Table 7.3.1.1.1-2
HARQ process number—4 bits
TPC command for scheduled PUSCH—2 bits as defined in Subclause 7.1.1 of [5, TS 38.213]
Padding bits, if required.
UL/SUL indicator—1 bit (may or may not be present) for UEs configured with supplementaryUplink in ServingCellConfig in the cell as defined in Table 7.3.1.1.1-1 of TS 38.212 and the number of bits for DCI format 1_0 before padding is larger than the number of bits for DCI format 0_0 before padding; 0 bit otherwise. The UL/SUL indicator, if present, locates in the last bit position of DCI format 0_0, after the padding bit(s).
DCI format 0_1 or a new Rel16 non-fallback UL DCI format 0_x (e.g., x=2, compact DCI format) may have one or more of the following fields (reference 3GPP TS 38.212 spec)
Identifier for DCI formats—1 bit
The value of this bit field is always set to 0, indicating an UL DCI format
Carrier indicator—0 or 3 bits, as defined in Subclause 10.1 of [TS38.213].
UL/SUL indicator—0 bit for UEs not configured with supplementaryUplink in ServingCellConfig in the cell or UEs configured with supplementaryUplink in ServingCellConfig in the cell but only PUCCH carrier in the cell is configured for PUSCH transmission; otherwise, 1 bit as defined in Table 7.3.1.1.1-1.
Bandwidth part indicator—0, 1 or 2 bits as determined by the number of UL BWPs configured by higher layers
Frequency domain resource assignment, number of bits determined based on one or more of NRB, the size of the active UL bandwidth part and NRBG which is defined in Subclause 6.1.2.2.1
Time domain resource assignment—0, 1, 2, 3, or 4 bits as defined in Subclause 6.1.2.1 of [TS38.214].
Frequency hopping flag—0 or 1 bit:
Modulation and coding scheme—5 bits as defined in Subclause 6.1.4.1 of [TS 38.214]
New data indicator—1 bit
Redundancy version—2 bits as defined in Table 7.3.1.1.1-2
HARQ process number—4 bits
1st downlink assignment index—1 or 2 bits:
1 bit for semi-static HARQ-ACK codebook;
2 bits for dynamic HARQ-ACK codebook.
2nd downlink assignment index—0 or 2 bits:
2 bits for dynamic HARQ-ACK codebook with two HARQ-ACK sub-codebooks;
0 bit otherwise.
SRS resource indicator—here number of bits is function of number of configured SRS resources in SRS resource set
Precoding information and number of layers, 0, 1, 2, 3, 4, 5 o 6 bits
Antenna ports, 0, 1, 2, 3, 4, or 5 bits
SRS request—2 bits as defined by Table 7.3.1.1.2-24 in TS 38.212
CSI request—0, 1, 2, 3, 4, 5, or 6 bits determined by higher layer parameter reportTriggerSize.
CBG transmission information (CBGTI)—0, 2, 4, 6, or 8 bits determined by higher layer parameter maxCodeBlockGroipsPerTransportBlock for PUSCH.
PTRS-DMRS association—number of bits determined as follows
0 bit ifPTRS-UplinkConfig is not configured and transform precoder is disabled, or if transform precoder is enabled, or if maxRank=1;
2 bits otherwise, where Table 7.3.1.1.2-25 and 7.3.1.1.2-26 are used to indicate the association between TRS port(s) and DMRS port(s) for transmission of one PT-RS port and two PT-RS ports respectively, and the DMRS ports are indicated by the Antenna ports field.
beta_offset indicator—0 if the higher layer parameter betaOfsets=semiStatic; otherwise 2 bits as defined by Table 9.3-3 in [TS 38.213].
DMRS sequence initialization—0 bit if transform precoder is enabled; 1 bit if transform precoder is disabled.
UL-SCH indicator—1 bit. A value of "1" indicates UL-SCH shall be transmitted on the PUSCH and a value of "0" indicates UL-SCH shall not be transmitted on the PUSCH.
Priority indication, 0, 1, or 2 bits
Methods
In one embodiment, a UE can be configured to receive one or more of DCI formats 1_0, 1_1, 0_1, 1_1 in PCell or cell x in active time, where the DCI format can be modified to indicate one or more of the following in one or more fields (e.g., each of the following may have separate field or one or more of the following can be jointly indicated in one or more fields):
a CC-group or SCell group index, via N=>1 bits, where N bits may comprise a new field or one or more of existing fields in the DCI format 1_0 and/or 1_1, where one or more existing fields are repurposed/reinterpreted. A group may comprise one or more (activated) CCs or SCells. The CCs or SCells in the group can be activated via a priori higher layer signalling. In an example, if there are N CC group or SCell group configured for a UE, N bits can be used to indicate status of each SCell group, e.g., dormancy or non-dormancy. For example, N bit bitmap can indicate status of each SCell group independently, such as each bit in N bits correspond to a configured SCell group where bit value zero(one) indicate dormancy (non-dormancy) or vice versa. In one example, each SCell group comprise one SCell and value of N can be a positive integer between 1 to 32. Such as N can be 15.

An identifier whether the indicated CC-group transition to dormancy-like behaviour to non-dormancy-like behaviour or vice versa. The identifier can be 1 bit or 2 bits. The identifier may comprise a new field or one or more of existing fields in the DCI format, where one or more existing fields are repurposed/reinterpreted. If 1 bit, bit value zero may indicate transition from non-dormancy-like to dormancy-like, and bit value 1 may indicate transition from dormancy-like to non-dormancy-like behaviour, or vice versa. If 2 bits, more statues can be indicated such as for dormancy-like behaviour, UE performs no PDCCH monitoring or sparse PDCCH monitoring, and for non-dormancy-like behaviour, UE performs PDCCH monitoring without restrictions according to SS set configuration or performs frequent PDCCH monitoring.

BWP indicator, which may comprise K=>0 bits, e.g., 0, 1, 2, 3, 4, or 5 bits. UE uses the indicated BWP in the indicated CC/SCell-group. If this field is absent, then UE uses the active BWP in the indicated CC/SCell-group.

Triggering aperiodic CSI RS and/or TRS in one or more CCs or SCells that are indicated to transition from dormancy-like behaviour to non-dormancy-like behaviour. This can be indicated in M=>1 bits. In one example, all zeros may be indicated if CSI-RS and/or TRS are not triggered and at least 1 bit among M bits has to be non-zero to indicate aperiodic CSI RS and/or TRS in at least one CC-group or SCell-group. All zero indication may be the case when DCI is indicating transitioning from non-dormancy-like to dormancy-like behaviour. The indication for trigger can be a new field or one or more of existing fields in the DCI format, where one or more existing fields are repurposed/reinterpreted. In an example, M can be 1, 2, 3, 4, 5, 6, 7, or 8 bits.

In one example, the fields where the above information is indicated can be configurable. The number of bits in one or more fields to indicate one or more above parameters can be UE specifically configured.

In one example, there can be N=2, 3, or 4 bits for CC/SCell-group indication. Below, we show an example in Table 1 where identifier is jointly encoded with CC/SCell group indication. Here, a field comprising three bits indicate a row index of a configured table. For example, if row index 2 is indicated, it implies CC/SCell-group 3 would transition from non-dormancy-like to dormancy-like state. The CC/SCell-group that are not indicated remain in current status, either in dormancy-like or non-dormancy-like, according to last indicated DCI or MAC CE command. In another example, 2-bit field can indicate CC/SCell-group index and 1-bit field can indicate transition to/from dormancy/non-dormancy-like status.

TABLE 1

| Row index | Identifier (1 bit) | CC/SCell-group indication (2 bits) |
|---|---|---|
| 0 | 0 | 00 → CC/SCell group 1 |
| 1 | 0 | 01 → CC/SCell group 2 |
| 2 | 0 | 10 → CC/SCell group 3 |
| 3 | 0 | 11 → CC/SCell group 4 |
| 4 | 1 | 00 → CC/SCell group 1 |
| 5 | 1 | 01 → CC/SCell group 2 |
| 6 | 1 | 10 → CC/SCell group 3 |
| 7 | 1 | 11 → CC/SCell group 4 |

In one example, mapping of a code-point of one or more fields to indicate the above is UE specifically configured by RRC signalling. The CRC of the DCI may be scrambled by C-RNTI, MCS-C-RNTI, CS-RNTI, or any other configured RNTI.

In one example, one or more the existing fields in the DCI formats identified above may have a certain combination of bit values to indicate that the DCI format is not scheduling data, e.g., one or more fields can be all 1's or all 0's, or a group of fields can be all 1's whereas another group of fields can be all 0's, and such combination of bit values in one or more existing fields can be specified in specification or configured for a UE by RRC signalling to indicate that the DCI format is not scheduling data. The rest of the fields in the DCI format or new added one or more fields can be used to indicate CC/SCell group index, identify whether the indicated CC-group transition to dormancy-like behaviour to non-dormancy-like behaviour or vice versa, BWP indication, aperiodic RS such as CSIRS or TRS trigger.

In one example, if UE receives a DCI format 0_1 with UL-SCH indicator of "0" and CSI request of all zero(s), this implies that the DCI format is neither scheduling data nor scheduling resource for aperiodic CSI report. Then, one or more of the remaining fields in the DCI format can be repurposed or reinterpreted to indicate CC/SCell group index, identify whether the indicated CC-group transition to dormancy-like behaviour to non-dormancy-like behaviour or vice versa, BWP indication, aperiodic RS such as CSIRS or TRS trigger in one or more the activated CC/SCell-group.

In another embodiment, a DCI format switching dormancy and non-dormancy behavior for SCells cannot schedule a data transmission. One special value or value combination of one or more existing fields of the DCI format indicates that the DCI format is used to switch dormancy and non-dormancy behavior for SCells without data scheduling. The above existing bit field(s) indicating that the DCI format is used to switch dormancy and non-dormancy behavior for SCells should be located to fixed positions in the DCI format irrespective of scheduling data or not. The following special value or value combination could be considered:

The frequency resource assignment field is set to special value, e.g. all bits are set to '1'. Or, A special value combination of MCS field and RV field is used. E.g. the value combination indicating TB disabling could be reused. In NR, it is $I_{MCS}=26$ for MCS field and $rv_{id}=1$ for RV field. For a DCI format scheduling one TB, the TB is disabled. For a DCI format scheduling 2 TBs, both TBs are disabled.

Except the above existing bit field(s) indicating that the DCI format is used to switch dormancy and non-dormancy behavior for SCells, one or more other existing fields in the DCI format may be omitted. The saved bits can be interpreted as the above new field switching dormancy and non-dormancy behavior for the SCells. By this way, there could exist enough bits so that dormancy/non-dormancy behavior could be indicated for each SCell individually. It is also possible that a group of SCells exploit same dormancy behavior so that the size of the above new field is reduced.

In one embodiment, a DCI format switching dormancy and non-dormancy behavior for SCells may schedule a data transmission or not schedule a data transmission depending on gNB choices. If the DCI format is scheduling a data transmission, a new field A is used to switch dormancy and non-dormancy behavior for SCells. To reduce bit overhead, the new field A may indicate dormancy behavior in granularity of a group of SCells, unless the number of SCells is small. If the DCI format is not scheduling a data transmission, a new field B could be used to switch dormancy and non-dormancy behavior for SCells. The new field B could have more bits than the new field A, so that it provides more flexible control on SCell dormancy behavior. For example, the new field B could switch dormancy/non-dormancy behavior of each SCell individually. The new field A may be a part of the new filed B. The new field A is an explicit new field in the DCI format.

A different RNTI is used to indicate whether data is scheduled or not by the DCI format. Alternatively, an explicit bit is added to the DCI format to indicate whether data is scheduled or not. If data is scheduled by the DCI format, the explicit new field A in the DCI format is used to switch dormancy and non-dormancy behavior of SCells. On the other hand, if data is not scheduled, one or more other existing fields in the DCI format may be omitted. The saved bits can be interpreted as the new field B.

Alternatively, one special value of the new field A indicates that no data is scheduled. While other values of the new field A indicate that data is scheduled and also indicates the dormancy behavior of SCells. If the new field A does not carry the above special value, data is scheduled by the DCI format and the explicit new field A in the DCI format is used to switch dormancy and non-dormancy behavior of SCells. On the other hand, if the new field A carries the above special value indicating that data is not scheduled, one or more other existing fields in the DCI format may be omitted. The saved bits can be interpreted as the new field B.

Alternatively, one special value or value combination of one or more existing fields of the DCI format indicates that data is not scheduled. While other values or value combinations of the one or more existing fields indicate that data is scheduled. The above existing bit field(s) indicating that the DCI format is used to switch dormancy and non-dormancy behavior for SCells should be located to fixed positions in the DCI format irrespective of scheduling data or not. The following special value or value combination could be considered, The frequency resource assignment field is set to special value, e.g. all bits are set to '1'. Or, A special value combination of MCS field and RV field is used. E.g. the value combination indicating TB disabling could be reused. In NR, it is $I_{MCS}=26$ for MCS field and $rv_{id}=1$ for RV field. For a DCI format scheduling one TB, the TB is disabled. For a DCI format scheduling 2 TBs, both TBs are disabled.

If the above existing bit field(s) do not carry the above special value or value combination, data is scheduled by the DCI format and the explicit new field A in the DCI format is used to switch dormancy and non-dormancy behavior of SCells. On the other hand, if the above existing bit field(s) carry the above special value or value combination indicating that data is not scheduled, one or more other existing fields in the DCI format may be omitted. The saved bits can be interpreted as the new field B.

In the above alternatives, there could exist enough saved bits so that dormancy/non-dormancy behavior could be indicated for each SCell individually. It is also possible that a group of SCells exploit same dormancy behavior so that the size of the new field B is reduced.

In one embodiment, a DCI format that indicate transition between dormancy and non-dormancy of one or more SCells may or may not schedule data. An identifier based on either an explicit bit or a certain combination of bit values in one or more fields, such as FDRA field, TDRA field, etc., can be used to indicate the DCI is scheduling data or not, and based on the identification, explicit X>1 bits can be used to indicate transition between dormancy and non-dormancy of one or more SCells. If the identifier indicates the DCI format is not scheduling data, X=X1>1 bits can be used explicitly, which comprises one or more of the existing fields (cf. TS 38.212, Section 7.3.1 for list of fields in DCI format 0_1 and 1_1, assumed to be included here as reference) where the used existing fields are repurposed to indicate transition between dormancy and non-dormancy, or a new field. In one example, X1 can be any integer from 1 to 15. If the identifier indicates the DCI format is scheduling data, X=X2>1 bits can be used which maybe an explicit new field or one or more existing fields can be repurposed to indicate transition between dormancy and non-dormancy. In one example, X2 is less than X1. X2 can be any integer from 1 to 5. Values of X1 and X2 can be configured by RRC. Examples of one or more of the existing fields that can be used to indicate transition between dormancy and non-dormancy include carrier indicator field, BWP indicator field etc. In one example, if the identifier is indicating DCI is scheduling data, explicit field indicates via bitmap which SCells or SCell groups transition to/from dormancy and non-dormancy. BWP indicator field indicates a BWP to be used in SCells that are indicated to transition to dormancy. Alternatively, dormant BWP is implicitly obtained or higher layer configured for the SCells, and UE uses that BWP for the SCells that transition to dormancy.

In another embodiment, a gNB could configure two or more BWPs for a SCell for a UE. One BWP is for dormancy and other BWP(s) are for non-dormancy. No matter which BWP for non-dormancy is activated, the SCell is switched to the BWP for dormancy once receiving a L signaling which switches the SCell from non-dormancy to dormancy. One BWP from the BWPs for non-dormancy could be set as default, so that it is activated right after receiving a L1 signaling which switches the SCell from dormancy to non-dormancy. The default BWP for non-dormancy could be the BWPs for non-dormancy with lowest BWP ID. Alternatively, an RRC signaling could be used to explicitly configure the BWP ID of the default BWP for non-dormancy. Alternatively, the default BWP for non-dormancy could be implicitly derived, e.g. the BWP for non-dormancy which is configured the fully overlap PRB resource with the BWP for dormancy is the default BWP for non-dormancy.

In another embodiment, a gNB could configure two or more BWPs for a SCell for a UE. One BWP is for dormancy and other BWP(s) are for non-dormancy. The BWP for dormancy is allocated a BWP ID, but UE doesn't expect a DCI for BWP switching indicates the BWP ID of the BWP for dormancy using BWP indicator field. Alternatively, the BWP for dormancy is not allocated a BWP ID or a special BWP ID, therefore it is not indicatable in BWP switching using BWP indicator field. Further, if the BWP for dormancy is not allocated a BWP ID, a gNB may configure one BWP for dormancy and up to $2^N$ BWPs for non-dormancy. The up to $2^N$ BWPs for non-dormancy can be identified by N bits of BWP indicator.

In another embodiment, a gNB could configure two or more BWPs for a SCell for a UE. One BWP is for dormancy and other BWP(s) are for non-dormancy. In Rel-15, bwp-InactivityTimer is the parameter which configures the duration in ms after which the UE falls back to the default BWP. The duration after which the UE falls back to the default BWP could be separately configured for each BWP, e.g. separate configuration of bwp-InactivityTimer for each BWP. Alternatively, the duration after which the UE falls back to the default BWP could be separately configured for the BWP for dormancy and other BWP(s) for non-dormancy, e.g. to configure two bwp-InactivityTimer which are used by BWP for dormancy and other BWP(s) for non-dormancy respectively. Alternatively, only the duration after which the UE falls back to the default BWP is configured for other BWP(s) for non-dormancy, while a UE using BWP for dormancy never falls back to the default BWP. Equivalently, the duration after which the UE falls back to the default BWP is infinite for the BWP for dormancy. That is, bwp-InactivityTimer is only configured for BWP(s) for non-dormancy. Right after a SCell is switched to the BWP for dormancy, the timer for UE to fall back to default BWP could be suspended. Correspondingly, right after the SCell is switched to a BWP for non-dormancy, the timer for UE to fall back to default BWP could be resumed. Alternatively, right after a SCell is switched to a BWP for non-dormancy, UE could reset the timer for UE to fall back to default BWP.

In one embodiment, for a UE outside active time, e.g. DRX_OFF, the WUS PDCCH can include X+1 bits for a UE, which includes one bit wakeup indication for Pcell and X bits for SCell group(s). E.g. X can be up to 5. The X bits for a UE could be immediately following the one-bit wakeup indication for the same UE. In this case, gNB only needs to configure a start bit position for the X+1 bits. Alternatively, the X bits for a UE could be separately configured for a UE from the one-bit wakeup indication for the same UE. With this alternative, gNB has more freedom to configure multiple UEs sharing the same bit(s) in the WUS PDCCH. Alternatively, for each bit of the X+1 bits for a UE, the bit position in WUS PDCCH can be separately configured by RRC. This alternative maximizes the flexibility for a gNB to configure multiple UEs sharing the same bit(s) in the WUS PDCCH. It is up to gNB implementation whether/how to configure multiple UEs which share the same bit(s).

In one embodiment, for a UE outside active time, e.g. DRX_OFF, the WUS PDCCH can include X+1 bits for a UE, which includes one bit wakeup indication for Pcell and X bits for SCell group(s). E.g. X can be up to 5. If the one-bit wakeup indication is disabled, it means Pcell doesn't need to be active in the following active time, e.g. DRX_ON. In this case, all SCells must keep dormancy even in case a configured bit for the UE is indicating non-dormancy for a group of SCells. If the one-bit wakeup indication is enabled, it means Pcell needs to be active in the following active time, e.g. DRX_ON. In this case, whether one or more SCells needs to switch into non-dormancy is controlled by the X bits configured for the UE.

Figure 2:
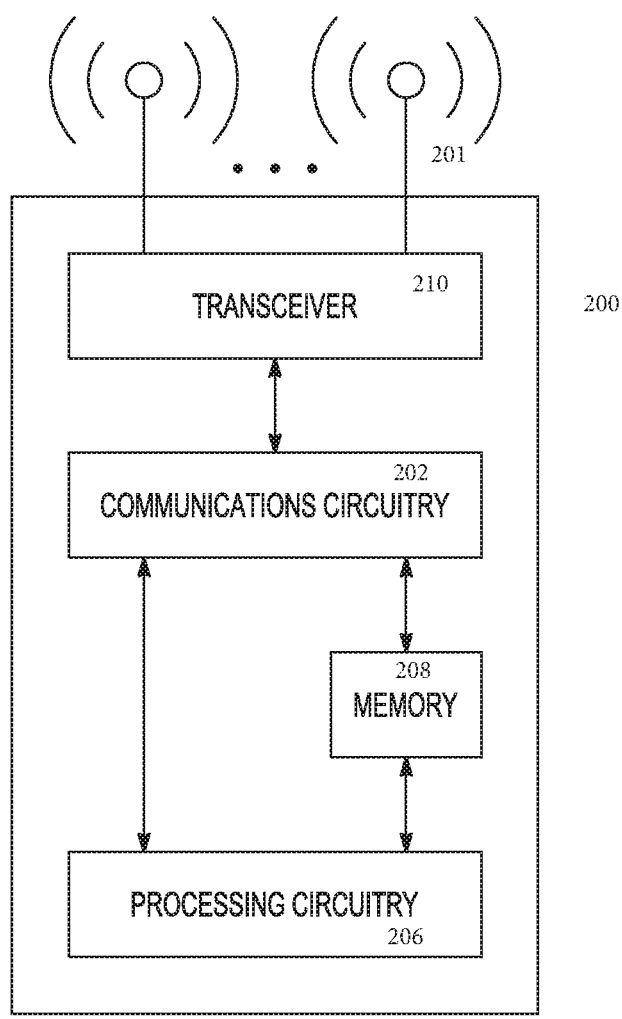
FIG. 2 is a block diagram of a communication station in accordance with some embodiments.

FIG. 2 is a block diagram of a communication station in accordance with some embodiments. In some embodiments, FIG. 2 illustrates a functional block diagram of a communication station that may be suitable for use as a UE 101 or UE 102 (FIG. 1). In some other embodiments, FIG. 2 illustrates a functional block diagram of a communication station that may be suitable for use as a gNB (i.e., RAN node 111, 112 (FIG. 1) in accordance with some embodiments. The communication station 200 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 200 may include communications circuitry 202 and a transceiver 210 for transmitting and receiving signals to and from other communication stations using one or more antennas 201. The communications circuitry 202 may include circuitry that can operate the physical layer (PHY) communications and/or medium access control (MAC) communications for controlling access to the wireless medium, and/or any other communications layers for transmitting and receiving signals. The communication station 200 may also include processing circuitry 206 and memory 208 arranged to perform the operations described herein. In some embodiments, the communications circuitry 202 and the processing circuitry 206 may be configured to perform operations detailed in the above figures, diagrams, and flows.

In accordance with some embodiments, the communications circuitry 202 may be arranged to contend for a wireless medium and configure frames or packets for communicating over the wireless medium. The communications circuitry 202 may be arranged to transmit and receive signals. The communications circuitry 202 may also include circuitry for modulation/demodulation, upconversion/downconversion, filtering, amplification, etc. In some embodiments, the processing circuitry 206 of the communication station 200 may include one or more processors. In other embodiments, two or more antennas 201 may be coupled to the communications circuitry 202 arranged for sending and receiving signals. The memory 208 may store information for configuring the processing circuitry 206 to perform operations for configuring and transmitting message frames and performing the various operations described herein. The memory 208 may include any type of memory, including non-transitory memory, for storing information in a form readable by a machine (e.g., a computer). For example, the memory 208 may include a computer-readable storage device, read-only memory (ROM), random-access memory (RAM), magnetic disk storage media, optical storage media, flash-memory devices and other storage devices and media.

In some embodiments, the communication station 200 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 200 may include one or more antennas 201. The antennas 201 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 200 may include one or more of a keyboard, a display, a non-volatile memory port, multiple antennas, a graphics processor, an application processor, speakers, and other mobile device elements. The display may be an LCD screen including a touch screen.

Although the communication station 200 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 200 may refer to one or more processes operating on one or more processing elements.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for a user equipment (UE) configured for operation in a fifth-generation new radio (5G NR) network, the apparatus comprising: processing circuitry; and memory,
    wherein the UE is configured with two or more secondary cells (SCells) of a group of SCells,
    wherein the processing circuitry is configured to:
    monitor a physical downlink control channel (PDCCH) for detection of a downlink control information (DCI) format 1_1;
    interpret the DCI format 1_1 as indicating SCell dormancy if the UE is configured with resourceAllocationType1 and if all bits of a frequency domain resource assignment field in the DCI format 1_1 are equal to 1; and
    interpret the DCI format 1_1 as scheduling a physical downlink shared channel (PDSCH) reception when either the UE is not configured with the resourceAllocationType1 or when all bits of the frequency domain resource assignment field in the DCI format 1_1 are not equal to 1,
    wherein when the DCI format 1_1 is interpreted as indicating SCell dormancy, the processing circuitry is configured to:
    interpret fields of the DCI format 1_1 as a bitmap for SCell dormancy indication; and
    either activate or deactivate a downlink bandwidth part (DL BWP) for an SCell of the group of configured SCells when indicated by the bitmap,
    wherein the memory is configured to store the bitmap.

2. The apparatus of claim 1, wherein when the fields of the DCI format 1_1 are interpreted as the bitmap for SCell dormancy indication, each bit of the bitmap corresponds to an activated SCell of the group of configured SCells, wherein a size of the bitmap is equal to a number of the groups of configured SCells.

3. The apparatus of claim 2, wherein when the fields of the DCI format 1_1 are interpreted as the bitmap for SCell dormancy indication,
    a '0' value for a bit of the bitmap indicates that an active DL BWP is a dormant DL BWP for an activated SCell in the group of configured SCells; and
    a '1' value for a bit of the bitmap indicates either:
    an active DL BWP for an activated SCell in the group of configured SCells if a current active DL BWP is the dormant DL BWP, or
    a current active DL BWP for an activated SCell in the group of configured SCells if the current active DL BWP is not the dormant DL BWP.

4. The apparatus of claim 2, wherein the fields of the DCI format 1_1 that are interpreted as the bitmap for SCell dormancy indication comprise a modulation and coding scheme field, a new data indicator field, a redundancy version field, a hybrid automatic request (HARD) process number field, an antenna port(s) field, and a demodulation reference signal (DMRS) sequence initialization field.

5. The apparatus of claim 4, wherein for an active DL BWP of an activated SCell, the processing circuitry is to configure the UE to monitor a PDCCH for the activated SCell and perform channel state information (CSI) measurements, and
    wherein for a dormant DL BWP of an activated SCell, the processing circuitry is to configure the UE to refrain monitoring a PDCCH for the activated SCell while configured in the UE to perform CSI measurements if configured.

6. The apparatus of claim 1, wherein the processing circuitry is further configured to decode radio-resource control (RRC) signalling, the RRC signalling to provide the UE with search space sets to monitor the PDCCH for detection of the DCI format 1_1, the RRC signalling to configure the UE with the resourceAllocationType1.

7. The apparatus of claim 6, wherein if the UE is provided search space sets to monitor the PDCCH for detection of DCI format 0_1 and the DCI format 1_1 and if one or both of the DCI format 0_1 and the DCI format 1_1 include an SCell dormancy indication field, the SCell dormancy indication field comprises the bitmap for SCell dormancy indication.

8. The apparatus of claim 1, wherein the processing circuitry is further configured to: decode downlink signals received within the activated DL BWPs of one or more of the SCells in accordance with carrier aggregation.

9. The apparatus of claim 8, wherein the processing circuitry comprises a baseband processor, and
    wherein the downlink signals are received through two or more antennas.

10. A non-transitory computer-readable storage medium that stores instructions for execution by processing circuitry of a user equipment (UE) configured for operation in a fifth-generation new radio (5G NR) network, wherein UE is configured with two or more secondary cells (SCells) of a group of SCells,
    wherein the instructions configure the processing circuitry is to:
    monitor a physical downlink control channel (PDCCH) for detection of a downlink control information (DCI) format 1_1;
    interpret the DCI format 1_1 as indicating SCell dormancy if the UE is configured with resourceAllocationType1 and if all bits of a frequency domain resource assignment field in the DCI format 1_1 are equal to 1; and
    interpret the DCI format 1_1 as scheduling a physical downlink shared channel (PDSCH) reception when either the UE is not configured with the resourceAllocationType1 or when all bits of the frequency domain resource assignment field in the DCI format 1_1 are not equal to 1,
    wherein when the DCI format 1_1 is interpreted as indicating SCell dormancy, the processing circuitry is configured to:
    interpret fields of the DCI format 1_1 as a bitmap for SCell dormancy indication; and either activate or deactivate a downlink bandwidth part (DL BWP) for an SCell of the group of configured SCells when indicated by the bitmap.

11. The non-transitory computer-readable storage medium of claim 10, wherein when the fields of the DCI format 1_1 are interpreted as the bitmap for SCell dormancy indication, each bit of the bitmap corresponds to an activated SCell of the group of configured SCells, wherein a size of the bitmap is equal to a number of the groups of configured SCells.

12. The non-transitory computer-readable storage medium of claim 11, wherein when the fields of the DCI format 1_1 are interpreted as the bitmap for SCell dormancy indication,
a '0' value for a bit of the bitmap indicates that an active DL BWP is a dormant DL BWP for an activated SCell in the group of configured SCells; and
a '1' value for a bit of the bitmap indicates either:
an active DL BWP for an activated SCell in the group of configured SCells if a current active DL BWP is the dormant DL BWP, or
a current active DL BWP for an activated SCell in the group of configured SCells if the current active DL BWP is not the dormant DL BWP.

13. The non-transitory computer-readable storage medium of claim 11, wherein the fields of the DCI format 1_1 that are interpreted as the bitmap for SCell dormancy indication comprise a modulation and coding scheme field, a new data indicator field, a redundancy version field, a hybrid automatic request (HARD) process number field, an antenna port(s) field, and demodulation reference signal (DMRS) sequence initialization field.

14. The non-transitory computer-readable storage medium of claim 13, wherein for an active DL BWP of an activated SCell, the processing circuitry is to configure the UE to monitor a PDCCH for the activated SCell and perform channel state information (CSI) measurements, and
wherein for a dormant DL BWP of an activated SCell, the processing circuitry is to configure the UE to refrain monitoring a PDCCH for the activated SCell while configured in the UE to perform CSI measurements if configured.

15. The non-transitory computer-readable storage medium of claim 10, wherein the processing circuitry is further configured to decode radio-resource control (RRC) signalling, the RRC signalling to provide the UE with search space sets to monitor the PDCCH for detection of the DCI format 1_1, the RRC signalling to configure the UE with the resourceAllocationType1.

16. The non-transitory computer-readable storage medium of claim 15, wherein if the UE is provided search space sets to monitor the PDCCH for detection of DCI format 0_1 and the DCI format 1_1 and if one or both of the DCI format 0_1 and the DCI format 1_1 include an SCell dormancy indication field, the SCell dormancy indication field comprises the bitmap for SCell dormancy indication.

17. An apparatus for next-generation Node B (gNB) configured for operation in a fifth-generation new radio (5G NR) network, the apparatus comprising: processing circuitry; and memory,
wherein for a user equipment (UE) configured with two or more secondary cells (SCells) of a group of SCells, the processing circuitry is configured to:
encode radio-resource control (RRC) signalling for transmission to the UE to configure the UE with a resourceAllocationType1;
encode a physical downlink control channel (PDCCH) for include a downlink control information (DCI) format 1_1 for transmission to the UE;
encode fields of the DCI format 1_1 as a bitmap for SCell dormancy indication to signal to the UE to either activate or deactivate a downlink bandwidth part (DL BWP) for an SCell of the group of configured SCells if the UE is configured with the resourceAllocationType1 and if all bits of a frequency domain resource assignment field in the DCI format 1_1 are set equal to 1; and
encode the fields of the DCI format 1_1 as scheduling a physical downlink shared channel (PDSCH) reception when either the UE is not configured with the resourceAllocationType1 or when all bits of the frequency domain resource assignment field in the DCI format 1_1 are not set equal to 1,
wherein the memory is configured to store the bitmap.

18. The apparatus of claim 17, wherein when the fields of the DCI format 1_1 are encoded as the bitmap for SCell dormancy indication, each bit of the bitmap corresponds to an activated SCell of the group of configured SCells, wherein a size of the bitmap is equal to a number of the groups of configured SCells.

19. The apparatus of claim 18, wherein when the fields of the DCI format 1_1 are encoded as the bitmap for SCell dormancy indication,
a '0' value for a bit of the bitmap indicates that an active DL BWP is a dormant DL BWP for an activated SCell in the group of configured SCells; and
a '1' value for a bit of the bitmap indicates either:
an active DL BWP for an activated SCell in the group of configured SCells if a current active DL BWP is the dormant DL BWP, or
a current active DL BWP for an activated SCell in the group of configured SCells if the current active DL BWP is not the dormant DL BWP.

20. The apparatus of claim 17, wherein the PDCCH is encoded for transmission through multiple antennas.

* * * * *